US006836520B1

(12) United States Patent
Chen et al.

(10) Patent No.: US 6,836,520 B1
(45) Date of Patent: Dec. 28, 2004

(54) METHOD AND APPARATUS FOR ESTABLISHING SYNCHRONIZATION WITH A SYNCHRONIZATION SIGNAL

(75) Inventors: Weizhong Chen, Keller, TX (US); Leo Dehner, Southlake, TX (US)

(73) Assignee: Motorola, Inc., Schaumburg, IL (US)

( * ) Notice: Subject to any disclaimer, the term of this patent is extended or adjusted under 35 U.S.C. 154(b) by 353 days.

(21) Appl. No.: 09/709,727

(22) Filed: Nov. 10, 2000

(51) Int. Cl.[7] ................................................. H04L 7/00
(52) U.S. Cl. ....................... 375/354; 375/149; 375/364; 375/365; 370/337; 370/342
(58) Field of Search ................................. 375/354, 142, 375/150, 149, 355, 365, 368, 364; 370/337, 342, 335

(56) References Cited

U.S. PATENT DOCUMENTS 5,590,160 A * 12/1996 Ostman ...................... 375/367
5,732,114 A * 3/1998 Thebault et al. ............ 375/368
5,949,817 A * 9/1999 Marshall ..................... 375/142
6,424,673 B1 * 7/2002 Chen et al. .................. 375/149

* cited by examiner

Primary Examiner—Shuwang Liu
(74) Attorney, Agent, or Firm—R. Louis Breeden; Matthew C. Loppnow

(57) ABSTRACT

A synchronization signal includes a plurality of predetermined synchronization symbols shaped by a predetermined symbol pulse. A receiver (100) receives (202) a signal including the synchronization signal, and a processor (106) determines (204) a first plurality of cross-correlations between the predetermined symbol pulse and the received signal. The processor calculates (206) a plurality of sums of products of the plurality of predetermined synchronization symbols and a predetermined subset of the first plurality of cross-correlations. The plurality of sums are mathematically equivalent to a second plurality of cross-correlations between the synchronization signal and the received signal. The processor locates (208) a peak of the plurality of sums to establish receiver synchronization.

24 Claims, 5 Drawing Sheets

500

METHOD AND APPARATUS FOR ESTABLISHING SYNCHRONIZATION WITH A SYNCHRONIZATION SIGNAL

RELATED APPLICATION

U.S. application Ser. No. 09/709,690, now U.S. Pat. No. 6,424,673, issued on Jul. 23, 2002, filed concurrently herewith by Chen et al., entitled "METHOD AND APPARATUS IN A WIRELESS COMMUNICATION SYSTEM FOR FACILITATING DETECTION OF, AND SYNCHRONIZATION WITH, A PREDETERMINED SYNCHRONIZATION SIGNAL" is a related application. Said application is hereby incorporated herein by reference.

FIELD OF THE INVENTION

This invention relates in general to wireless communication systems, and more specifically to a method and apparatus for establishing synchronization with a synchronization signal.

BACKGROUND OF THE INVENTION

A digital communication receiver must establish synchronization with a received signal before decoding the information in the received signal. One synchronization technique has been to perform a plurality of cross-correlations between a known synchronization pattern and the received signal, each cross-correlation calculated for a different portion of the received signal, until a point of highest correlation is detected.

Some systems, such as Bluetooth, utilize rather lengthy synchronization signals, causing a straightforward calculation of the cross-correlation values to require large amounts of memory and processing. Such a requirement is undesirable, especially in portable, battery-powered devices.

Thus, what is needed is an efficient method and apparatus for establishing synchronization with a received signal. Preferably, the method and apparatus will not require large amounts of memory and processing.

DETAILED DESCRIPTION OF THE DRAWINGS

Figure 1:
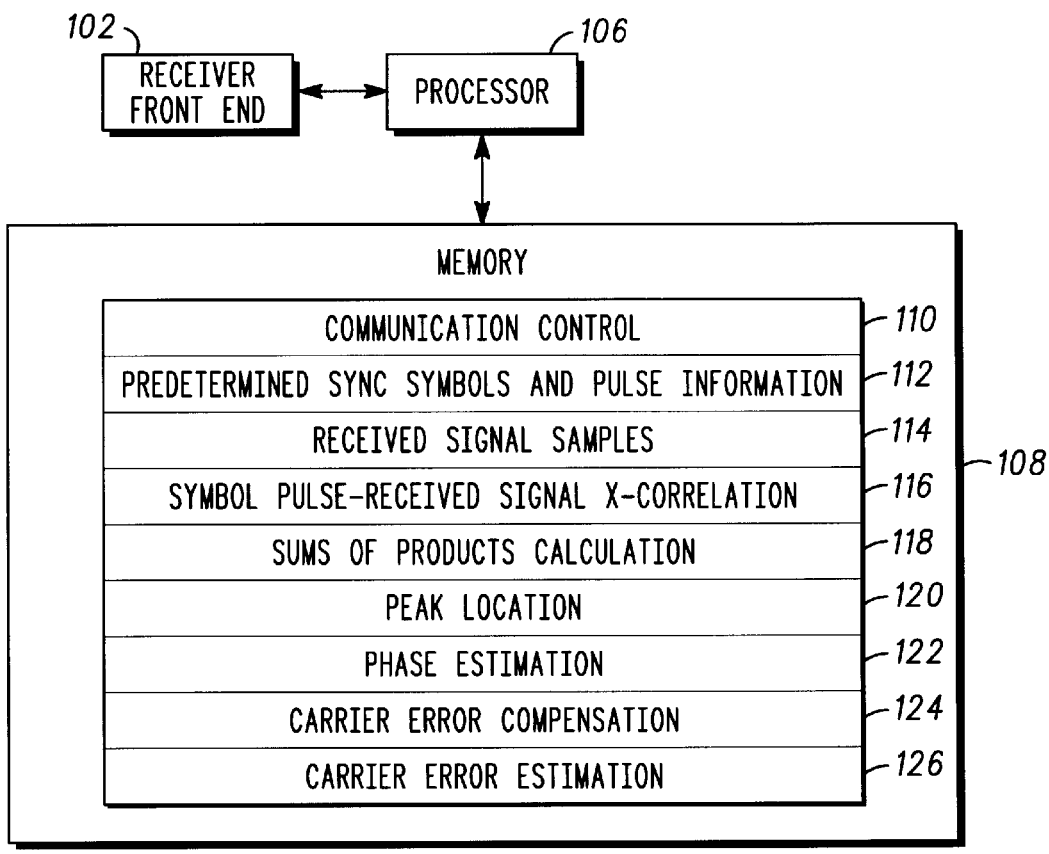
FIG. 1 is an electrical block diagram of an exemplary communication receiver in accordance with the present invention.

Referring to FIG. 1, an electrical block diagram depicts an exemplary communication receiver 100 in accordance with the present invention comprising a conventional receiver front end 102 for receiving and demodulating a received signal. The receiver 100 further comprises a processor 106 coupled to the receiver front end 102 for processing the received signal to establish synchronization with a synchronization signal present in the received signal. The synchronization signal preferably comprises a plurality of predetermined synchronization symbols, each shaped by a predetermined symbol pulse. The receiver 100 also includes a memory 108 coupled to the processor 106 for storing operating variables and software for programming the processor. It will be appreciated that, alternatively, the processor 106 can be arranged such that the memory 108 is included as an integral component of the processor, and that the functions of the processor 106 and the memory 108 can also be manufactured as an application-specific integrated circuit (ASIC).

The memory 108 comprises a communication control program 110 for programming the processor 106 to control the communications of the receiver 100 through well-known techniques. The memory 108 also includes a location 112 for storing the predetermined symbols and information describing the predetermined symbol pulse. In addition the memory 108 has a location for storing received signal samples 114 being used for various computations. The memory 108 further comprises a symbol pulse-received signal cross-correlation program 116 for programming the processor 106 to determine a first plurality of cross-correlations between the predetermined symbol pulse and the received signal.

The memory 108 also includes a sums of products calculation program 118 for programming the processor 106 to calculate a plurality of sums of products of the plurality of predetermined synchronization symbols and a predetermined subset of the first plurality of cross-correlations. The programs 116, 118 operate such that the plurality of sums are mathematically equivalent to a second plurality of cross-correlations between the synchronization signal and the received signal, but are advantageously much less computationally intense and more memory efficient. In addition, the memory 108 includes a peak location program 120 for programming the processor 106 to locate a peak of the plurality of sums to establish receiver synchronization. The memory further comprises a phase estimation program 122 for programming the processor 106 to estimate the phase of a complex signal. The memory 108 also includes a carrier error compensation program 124 for programming the processor 106 to compensate the plurality of sums for a predetermined plurality of trial carrier errors, thereby generating a plurality of compensated sums. In addition, the memory 108 includes a carrier error estimation program 126 for programming the processor 106 to identify one of the plurality of trial carrier errors which produces a largest magnitude squared value of the plurality of compensated sums as the estimated carrier error for the receiver 100. Operation of the receiver 100 in accordance with the present invention will be described further below.

Figure 2:
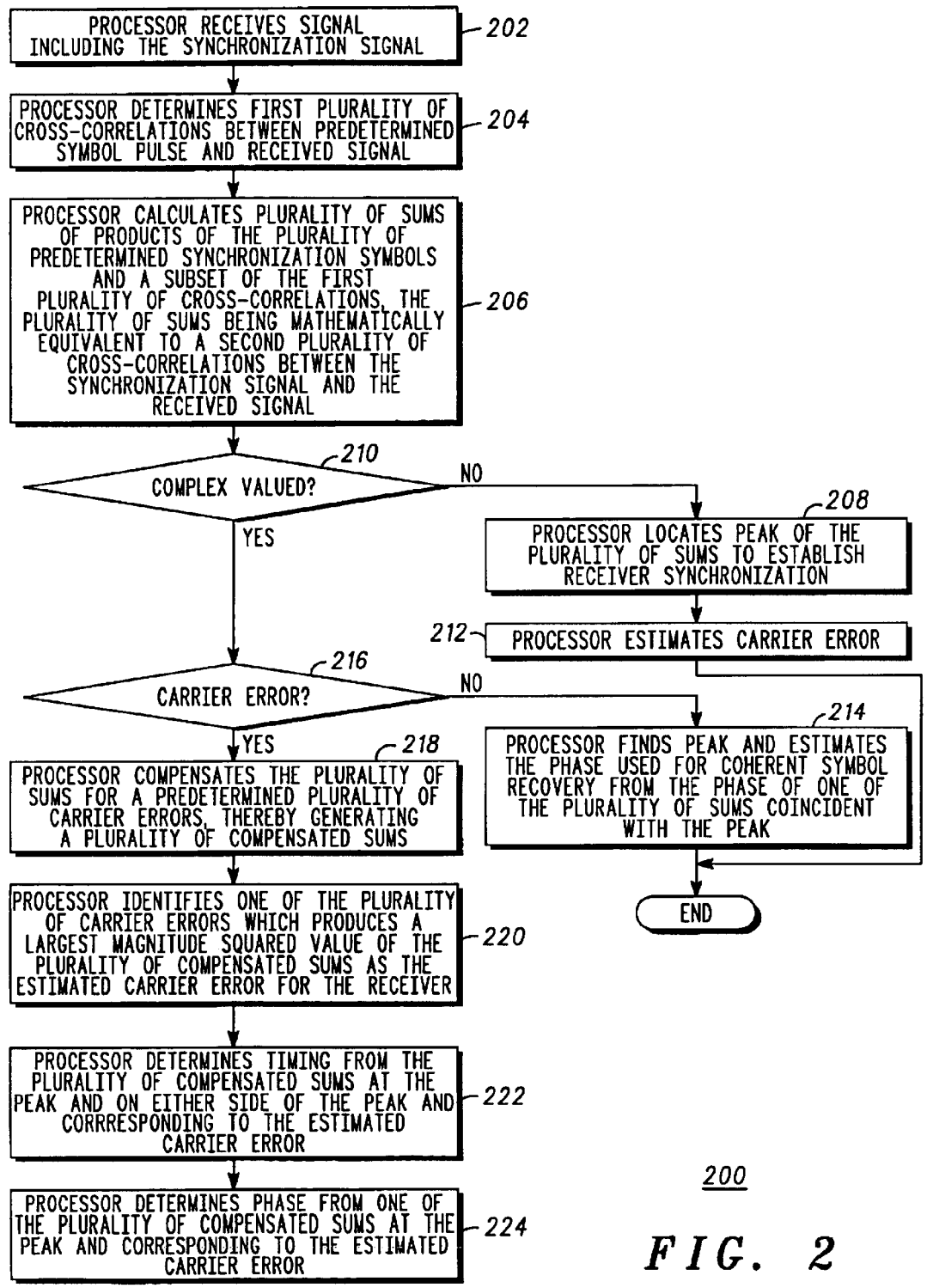
FIG. 2 is a first flow diagram depicting a synchronization technique used in the communication receiver in accordance with the present invention.

FIG. 2 is a first flow diagram 200 depicting a general synchronization technique used in the communication receiver 100 in accordance with the present invention. The diagram 200 begins with the processor 106 receiving 202 a signal including the synchronization signal. As the samples of the received signal arrive, the processor 106 determines 204 a first plurality of cross-correlations between the predetermined symbol pulse and the received signal. The processor 106 also calculates 206 a plurality of sums of products of the plurality of predetermined synchronization symbols and a predetermined subset of the first plurality of cross-correlations, the plurality of sums being mathematically equivalent to a second plurality of cross-correlations between the synchronization signal and the received signal. When at step 210 the particular embodiment of the present invention is for a received signal and synchronization symbols which are not complex valued, the processor 106 locates 208 the peak of the plurality of sums to establish the receiver synchronization. The processor 106 then estimates the carrier error through well-known techniques, and the process ends.

If, on the other hand, the embodiment is for a received signal and synchronization symbols which are complex valued, at step 210 the flow moves to step 216, where the processor 106 checks 216 whether the particular embodiment also performs carrier error correction. If not, the processor 106 finds 214 the peak, preferably by locating the one of the plurality of sums having the largest magnitude squared value. The processor 106 then estimates the phase that will be used for coherent symbol recovery from the phase of one of the plurality of sums coincident with the peak.

If, on the other hand, at step 216 carrier error detection is to be performed, then the processor 106 compensates 218 the plurality of sums for a predetermined plurality of carrier errors, thereby generating a plurality of compensated sums. The processor 106 then identifies 220 one of the plurality of carrier errors which produces a largest magnitude squared value of the plurality of compensated sums as the estimated carrier error for the receiver. The processor 106 determines 222 the timing of the received signal from the plurality of compensated sums at the peak and on either side of the peak and corresponding to the estimated carrier error, preferably by applying a well-known second-order polynomial fitting technique. The processor 106 then determines 224 the phase of the received signal from one of the plurality of compensated sums at the peak and corresponding to the estimated carrier error, preferably as the arctangent of the quadrature portion of the one of the compensated sums divided by the real portion.

The following describes the synchronization process in greater detail, emphasizing efficient techniques for performing the calculations. We will begin with the efficient calculation of the cross-correlation of the received signal x(n) and the predetermined synchronization signal s(m).

$$R_{SX}(n) = \sum_{m=1}^{N} x(m+n)s(m)$$

In one embodiment, the symbol rate is 1 million symbols per second. The synchronization signal includes 64 FSK symbols, which are real valued $$\alpha_k = \pm 1$$

and there are 4 samples per symbol. In the cross-correlation equation above, N is then 256. A straightforward calculation of the cross-correlation would thus require 256×2=512 memory locations, and further would require 256 multiplications and 256 additions per 0.25 microsecond. This is equivalent to about 1024 million instructions per second (MIPS).

As received, each symbol pulse stretches over about 12 samples. The synchronization signal can be represented as $$s(m) = \sum_{k=1}^{64} \alpha_k g_s(m - 4k)$$

where $g_s$ represents the symbol pulse. Substituting the right side of the above equation into the cross-correlation equation and simplifying the equation with the intent of reducing the memory and processing requirements produces the following transformation.

$$R_{SX}(n) = \sum_m x(m+n)s(m)$$

$$= \sum_m x(m+n) \sum_{k=1}^{64} \alpha_k g_s(m-4k)$$

$$= \sum_{k=1}^{64} \alpha_k R_{GX}(n+4k)$$

where $$R_{GX}(n) = \sum_{m=-6}^{6} g_s(m) x(n+m)$$

$$= \sum_{m=1}^{6} g_s(m)[x(n+m) + x(n-m)]$$

This transformation advantageously reduces the memory requirements to 253+12=265 locations, and substantially reduces the calculations to 6 multiplications and 6+5+64=75 additions—about a 95% saving in calculations. In addition, the complexity of the 6 multiplications is equivalent to the complexity of 3 of the multiplications of the straightforward approach, because the $g_s(m)$ values are known and can be built into the multipliers. Also, the generation of s(m), m=1, 2, . . . , 256 from $\alpha_k$, k=1, 2, . . . , 64 is avoided. The significant reduction in calculations advantageously translates directly into power reduction, which can be especially important in a portable wireless transceiver, for example.

Figure 3:
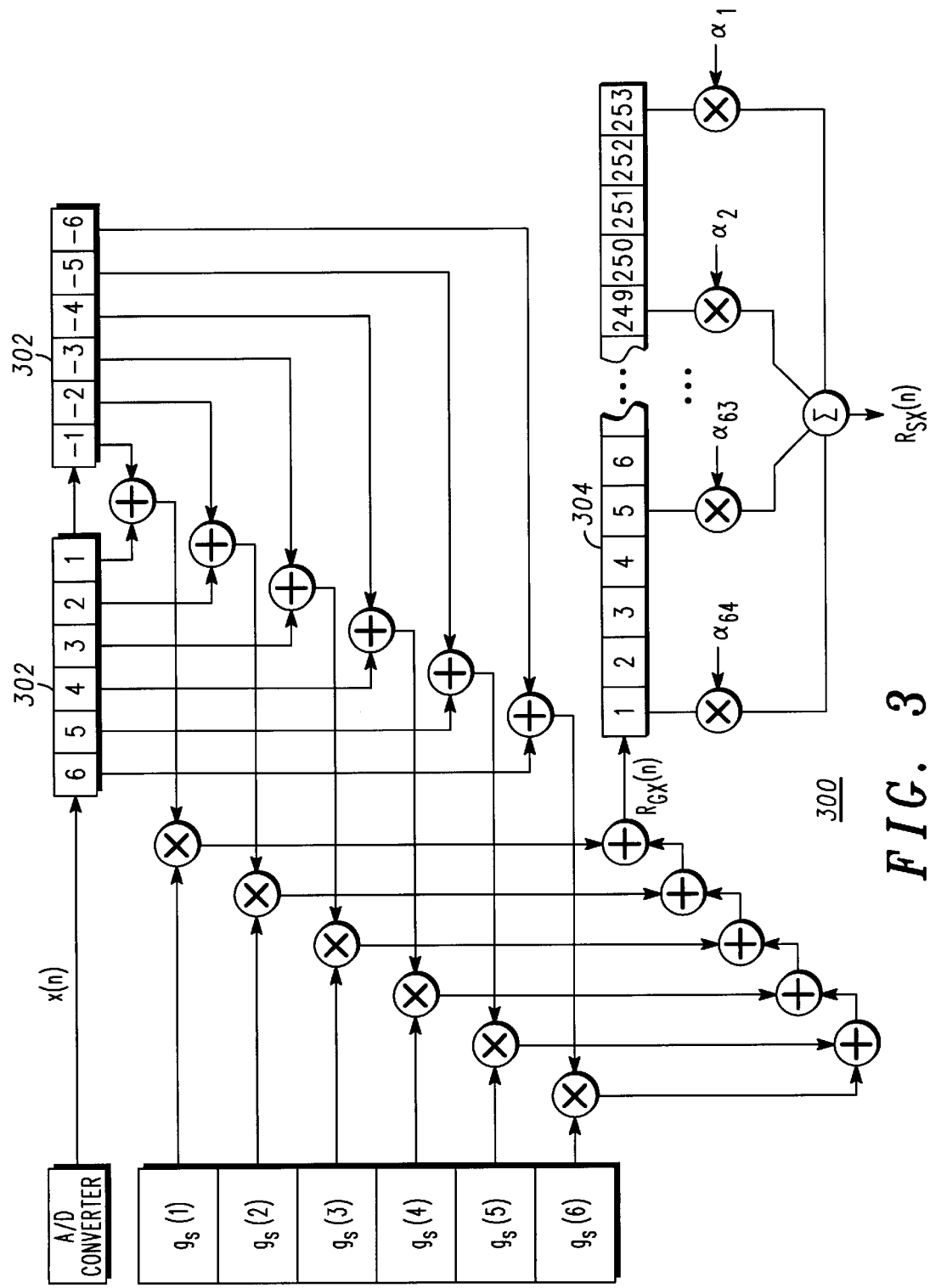
FIG. 3 is a second flow diagram depicting an efficient implementation for calculating the cross-correlation for a frequency shift keyed channel in accordance with the present invention.

FIG. 3 is a second flow diagram 300 depicting an efficient implementation for calculating the cross-correlation for a frequency shift keyed channel in accordance with the present invention. A first shift register 302 receives each sample of the received signal x(n). The twelve positions of the first shift register 302 are tapped and the values therein combined with the six values of $g_s(n)$ in six multipliers and 11 adders to generate $R_{GX}(n)$. A second shift register 304 receives each sample of $R_{GX}(n)$ and is tapped at every fourth position to generate $R_{SX}(n)$. Note that, because the $\alpha_k$ values are ±1, the 64 multipliers associated therewith are realized quite simply, as they only change the sign of the value received from the shift register 604.

When the received signal and the synchronization signal are complex valued, as in PSK modulation, the synchronization can be accomplished as follows. The synchronization signal can be expressed as $$s(m) = \sum_{k=1}^{64} \alpha_k g_s(m - 4k)$$

where the synchronization symbols are $$\alpha_k = e^{j\phi_k}$$

and $g_s(m)$ is the real-valued symbol pulse. The received signal is $$x(n) = e^{j\phi} s(m) + N(n)$$

where $\phi$ is a random phase offset between the transmitter and the receiver, uniformly distributed over $[-\pi, \pi]$, and $N(n)$ is noise (which averages out of the cross-correlation and can be ignored). As in the real-valued case described above, the cross-correlation of the received signal and the predetermined synchronization signal is used $$R_{SX}(n) = \sum_{m=1}^{N} x(m+n)\bar{s}(m)$$

where $\bar{s}$ is the complex conjugate of the sync signal. The peak of the magnitude squared value of the cross-correlation $|R_{SX}(n)|^2$ will provide the timing of the channel. The phase $\phi$ of $R_{SX}(n)$ at the peak will provide the phase estimation, which can be used for coherent symbol recovery.

The efficient calculation of the cross-correlation is similar to that of the real-valued case.

$$R_{SX}(n) = \sum_{m=1}^{M} x(m+n)\bar{s}(m)$$
$$= \sum_{m=1}^{M} x(m+n) \sum_{k=1}^{K} \bar{\alpha}_k g_s(m-4k)$$
$$= \sum_{k=1}^{K} \bar{\alpha}_k R_{GX}(n+4k)$$

where $\bar{\alpha}_k$ is the complex conjugate of the sync symbol, and where $$R_{GX}(n) = \sum_{m=-l_c}^{l_g} g_s(m) x(n+m)$$
$$= \sum_{m=1}^{l_g} g_s(m)[x(n+m) + x(n-m)]$$

However, the real and quadrature portions of $R_{GX}(n)$ are calculated separately.

$$R_{GX}(n) = \sum_{m=1}^{l_g} g_s(m)[x_I(n+m) + x_I(n-m)] + j\sum_{m=1}^{l_g} g_s(m)[x_Q(n+m) + x_Q(n-m)]$$

Thus $$R_{SX}(n) = \sum_{k=1}^{K} \bar{\alpha}_k [R_{GXI}(n+4k) + jR_{GXQ}(n+4k)]$$

where $$R_{GXI}(n) = \sum_{m=1}^{l_g} g_s(m)[x_I(n+m) + x_I(n-m)] \text{ and}$$

$$R_{GXQ}(n) = \sum_{m=1}^{l_g} g_s(m)[x_Q(n+m) + x_Q(n-m)]$$

Figure 4:
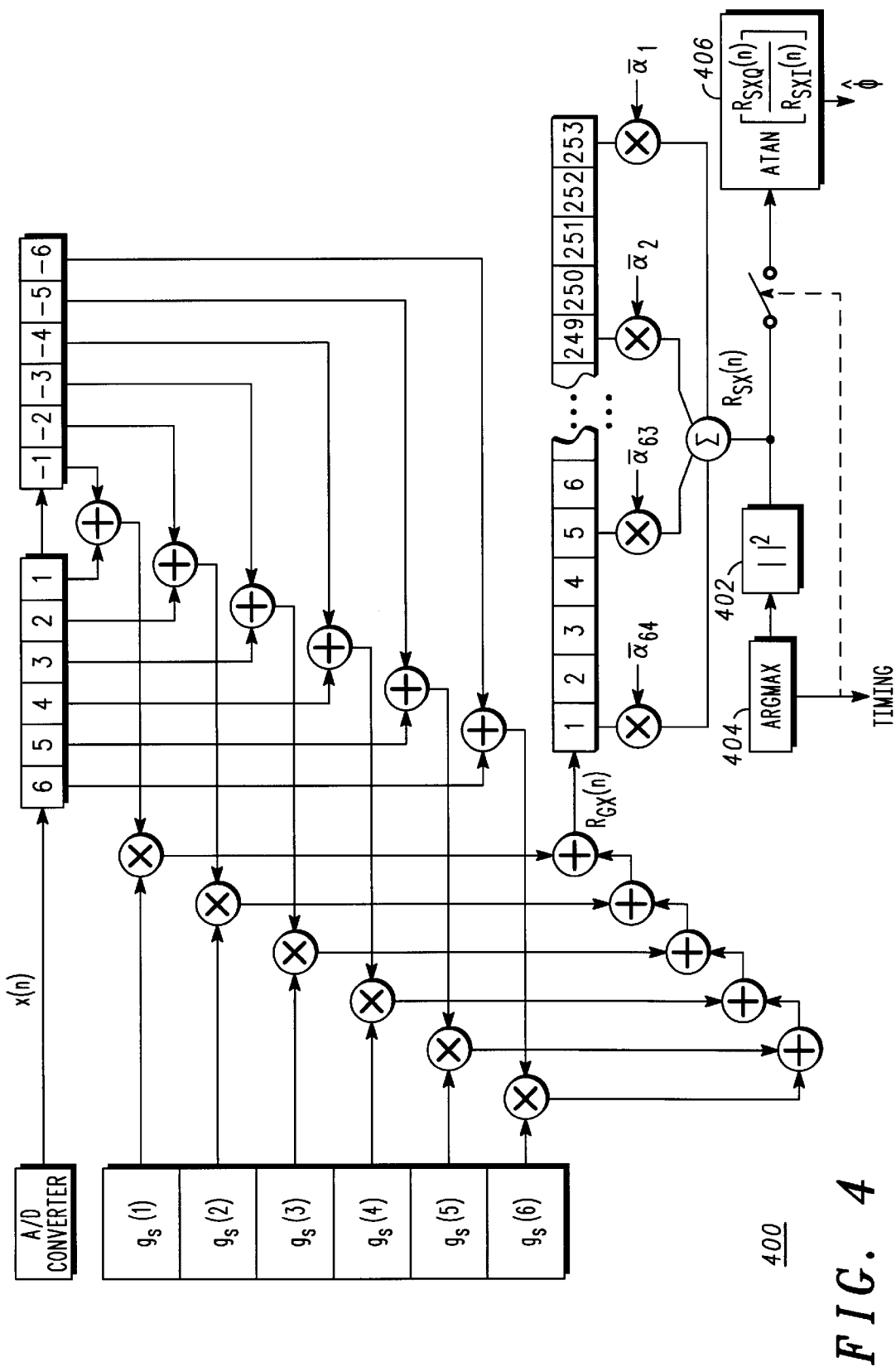
FIG. 4 is a third flow diagram depicting an efficient implementation for calculating the cross-correlation for a phase shift keyed channel in accordance with the present invention.

FIG. 4 is a third flow diagram 400 depicting an efficient implementation for calculating the cross-correlation for a complex-valued phase shift keyed channel in accordance with the present invention. The diagram 400 is similar to the diagram 300, the essential differences being the elements 402, 404, and 406. Element 402 calculates the magnitude squared value of the cross-correlation. Element 404 finds the peak through well-known techniques, and determines the timing therefrom. Element 406 estimates the phase.

When carrier error is present in the complex-valued case, the above calculations must compensate for the carrier error. As before, the cross-correlation of the received signal with the predetermined synchronization signal is derived from a plurality of cross-correlations of the received signal with the predetermined symbol pulse. Thus, for each sample index n the cross-correlation of the received signal with the predetermined symbol pulse is needed.

$$R_{GX}(n) = \sum_{m=-l_g}^{l_g} x(m+n) g_s(m)$$

This is calculated efficiently exactly as before for the complex-valued case.

In deriving the cross-correlation of the received signal with the predetermined synchronization signal, however, the effect of the carrier error must be taken into consideration.

$$R_{SX}(\omega_l, n) \approx \sum_{k=1}^{K} \bar{\alpha}_k e^{-j\omega_l T_S(k-1)} R_{GX}(n+kT_S)$$

The above equation is modified because $$R_{GX}(\omega_l, n+kT_S) = e^{-\omega_l T_S(k-1)} R_{GX}(n+kT_S)$$

is to remove the carrier error effects in the symbol correlation $$R_{GX}(n+kT_S)$$

Since we do not know in advance what the carrier error is, we will use a plurality of trial values $\omega_l$, where $\omega_l$ is in the search window $\omega_l = -\omega_{max}, \ldots, \omega_{max}$ with $N_\omega$ trials. This requires recursive calculation for $$e^{-j\omega_l T_S k} = \{e^{-j\omega_l T_S(k-1)}\} e^{-j\omega_l T_S},$$

$k = 1, 2, \ldots N/T_S$, and $\omega_l = -\omega_{max}, \ldots, \omega_{max}$

Also required are $N_\omega$ correlations $$R_{SX}(\omega_l, n) = \sum_{k=1}^{K} \bar{\alpha}_k R_{GX}(\omega_l, n+kT_S),$$

each requiring K complex multiplications. Peak metrics and carrier-error estimates are determined for each sample received $$P = \max_{\omega_l, n} |R_{SX}(\omega_l, n)|^2,$$

and $$\omega_{max}(n) = \text{argmax}_{\omega_m} |R_{SX}(\omega_l, n)|^2$$

The three most recently calculated peak metrics and carrier-error estimates, as well as the three most recently calculated cross-correlations at the corresponding carrier-error estimates are saved in three shift registers.

P→P(1)→P(2)→P(3) and $\omega_{max}$→$\omega(1)$→$\omega(2)$→$\omega(3)$ $R_{SX}$($\omega_{max}$,n)→R(1)→R(2)→R(3)

A peak is detected if P(2)≧P(3) and P(2)>P(1)

The timing estimate is preferably calculated from a second-order interpolation from

{P(3),P(2),P(1)}

The carrier error estimate is equal to $\omega(2)$. The phase is calculated from the real and quadrature parts of the cross-correlation.

$$\hat{\phi} = a\tan\frac{R_Q(2)}{R_I(2)}$$

Figure 5:
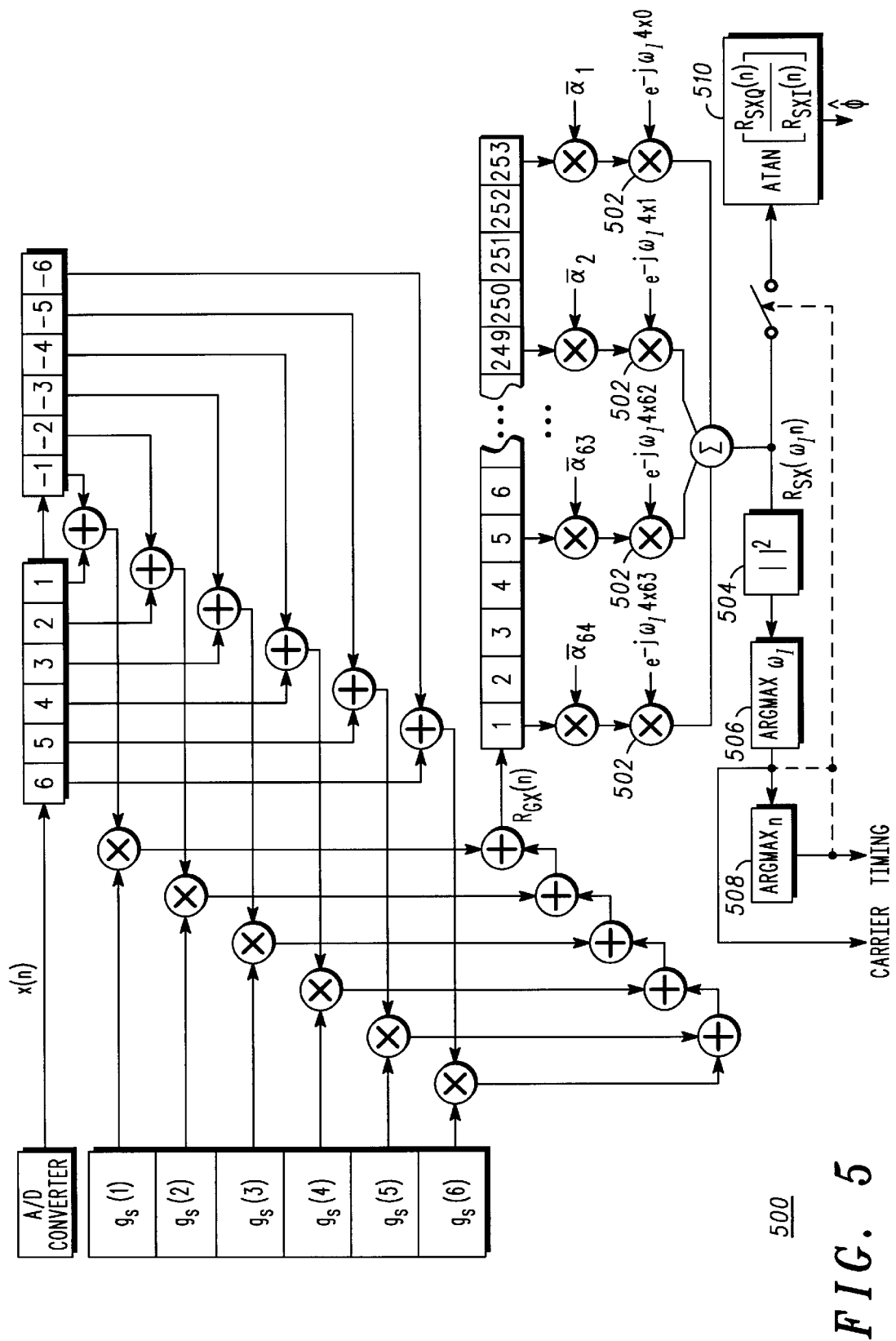
FIG. 5 is a fourth flow diagram depicting an efficient implementation for calculating the cross-correlation for a phase shift keyed channel with carrier error in accordance with the present invention.

FIG. 5 is a fourth flow diagram 500 depicting an efficient implementation for calculating the cross-correlation for a phase shift keyed channel with carrier error in accordance with the present invention. The diagram 500 is similar to the diagram 300, the essential differences being the elements 502 through 510. The complex multipliers 502 compensate for the carrier error. The peak metric calculator 504 calculates the magnitude squared value of the cross correlation for each sample interval and each carrier error trial value. The carrier-er-or estimator 506 determines the carrier estimate at the correlation peak, while the timing estimator 508 determines the timing at that carrier error estimate. The phase estimator 510 estimates the phase at that timing and carrier error estimate.

It should be clear from the preceding disclosure that the present invention provides a method and apparatus for establishing synchronization with a received signal. Advantageously, the method and apparatus does not require large amounts of memory and processing and it performs efficiently with both real-valued and complex signals.

Many modifications and variations of the present invention are possible in light of the above teachings. For example, although specific synchronization signal sizes, symbol rates, samples per symbol, and samples per symbol pulse were given in the example embodiments presented herein above, one of ordinary skill in the art will readily be able to envision modifications to these and other parameters without departing from the scope of the present invention. Thus, it is to be understood that, within the scope of the appended claims, the invention can be practiced other than as specifically described herein above.

What is claimed is:

1. A method in a communication receiver for establishing synchronization with a synchronization signal comprising a plurality of predetermined synchronization symbols, each shaped by a predetermined symbol pulse, the method comprising the steps of:

receiving a signal including the synchronization signal;

determining a first plurality of cross-correlations between the predetermined symbol pulse and the received signal;

calculating a plurality of sums of products of the plurality of predetermined synchronization symbols and a subset of the first plurality of cross-correlations, said plurality of sums being mathematically equivalent to a second plurality of cross-correlations between the synchronization signal and the received signal; and locating a peak of said plurality of sums to establish receiver synchronization.

2. The method of claim 1, wherein the received signal and the predetermined synchronization symbols are complex valued, and wherein the determining step comprises the step of determining the first plurality of cross-correlations separately for real and quadrature portions of the received signal.

3. The method of claim 1, wherein the received signal and the predetermined synchronization symbols are complex valued, and wherein the calculating step comprises the step of calculating said plurality of sums from products of complex conjugates of the plurality of predetermined synchronization symbols and a predetermined subset of the first plurality of cross-correlations.

4. The method of claim 1, wherein the received signal and the predetermined synchronization symbols are complex valued, and wherein the locating step comprises the step of locating the peak from a magnitude squared value of said plurality of sums.

5. The method of claim 1, wherein the received signal and the predetermined synchronization symbols are complex valued, and wherein the method further comprises the step of estimating a phase used for coherent symbol recovery from the phase of one of said plurality of sums coincident with the peak.

6. The method of claim 1, wherein the received signal and the predetermined synchronization symbols are complex valued and a carrier error exists between the received signal and the communication receiver, wherein the calculating step comprises the step of compensating said plurality of sums for a predetermined plurality of carrier errors, thereby generating a plurality of compensated sums, and identifying one of the predetermined plurality of carrier errors which produces a largest magnitude squared value of said plurality of compensated sums as an estimated carrier error for the receiver.

7. The method of claim 6, further comprising the step of determining timing from said plurality of compensated sums at the peak and on either side of the peak and corresponding to the estimated carrier error.

8. The method of claim 6, further comprising the step of determining phase from one of said plurality of compensated sums at the peak and corresponding to the estimated carrier error.

9. A communication receiver for establishing synchronization with a synchronization signal comprising a plurality of predetermined synchronization symbols, each shaped by a predetermined symbol pulse, the communication receiver comprising:

a receiver front end for receiving a signal including the synchronization signal; and a processor coupled to the receiver front end for processing the received signal, wherein the processor is programmed to:

determine a first plurality of cross-correlations between the predetermined symbol pulse and the received signal;

calculate a plurality of sums of products of the plurality of predetermined synchronization symbols and a subset of the first plurality of cross-correlations, said plurality of sums being mathematically equivalent to a second plurality of cross-correlations between the synchronization signal and the received signal; and locate a peak of said plurality of sums to establish receiver synchronization.

10. The communication receiver of claim 9, wherein the received signal and the predetermined synchronization symbols are complex valued, and wherein the processor is further programmed to determine the first plurality of cross-correlations separately for real and quadrature portions of the received signal.

11. The communication receiver of claim 9, wherein the received signal and the predetermined synchronization symbols are complex valued, and wherein the processor is further programmed to calculate said plurality of sums from products of complex conjugates of the plurality of predetermined synchronization symbols and a predetermined subset of the first plurality of cross-correlations.

12. The communication receiver of claim 9, wherein the received signal and the predetermined synchronization symbols are complex valued, and wherein the processor is further programmed to locate the peak from a magnitude squared value of said plurality of sums.

13. The communication receiver of claim 9, wherein the received signal and the predetermined synchronization symbols are complex valued, and wherein the processor is further programmed to estimate a phase used for coherent symbol recovery from the phase of one of said plurality of sums coincident with the peak.

14. The communication receiver of claim 9, wherein the received signal and the predetermined synchronization symbols are complex valued, and a carrier error exists between the received signal and the communication receiver, wherein the processor is further programmed to:

compensate said plurality of sums for a predetermined plurality of carrier errors, thereby generating a plurality of compensated sums, and identify one of the predetermined plurality of carrier errors which produces a largest magnitude squared value of said plurality of compensated sums as an estimated carrier error for the receiver.

15. The communication receiver of claim 14, wherein the processor is further programmed to determine timing from said plurality of compensated sums at the peak and on either side of the peak and corresponding to the estimated carrier error.

16. The communication receiver of claim 14, wherein the processor is further programmed to determine phase from one of said plurality of compensated sums at the peak and corresponding to the estimated carrier error.

17. An apparatus for use with a receiver front end that receives a signal including a predetermined synchronization signal comprising a plurality of predetermined synchronization symbols, each shaped by a predetermined symbol pulse, the apparatus for establishing synchronization with the received signal, the apparatus comprising:

a processor for processing the received signal, wherein the processor is programmed to:

determine a first plurality of cross-correlations between the predetermined symbol pulse and the received signal;

calculate a plurality of sums of products of the plurality of predetermined synchronization symbols and a subset of the first plurality of cross-correlations, said plurality of sums being mathematically equivalent to a second plurality of cross-correlations between the synchronization signal and the received signal; and locate a peak of said plurality of sums to establish receiver synchronization.

18. The apparatus of claim 17, wherein the received signal and the predetermined synchronization symbols are complex valued, and wherein the processor is further programmed to determine the first plurality of cross-correlations separately for real and quadrature portions of the received signal.

19. The apparatus of claim 17, wherein the received signal and the predetermined synchronization symbols are complex valued, and wherein the processor is further programmed to calculate said plurality of sums from products of complex conjugates of the plurality of predetermined synchronization symbols and a predetermined subset of the first plurality of cross-correlations.

20. The apparatus of claim 17, wherein the received signal and the predetermined synchronization symbols are a complex valued, and wherein the processor is further programmed to locate the peak from a magnitude squared value of said plurality of sums.

21. The apparatus of claim 17, wherein the received signal and the predetermined synchronization symbols are complex valued, and wherein the processor is further programmed to estimate a phase used for coherent symbol recovery from the phase of one of said plurality of sums coincident with the peak.

22. The apparatus of claim 17, wherein the received signal and the predetermined synchronization symbols are complex valued, and a carrier error exists between the received signal and the receiver front end, wherein the processor is further programmed to:

compensate said plurality of sums for a predetermined plurality of carrier errors, thereby generating a plurality of compensated sums, and identify one of the predetermined plurality of carrier errors which produces a largest magnitude squared value of said plurality of compensated sums as an estimated carrier error for the receiver.

23. The apparatus of claim 22, wherein the processor is further programmed to determine timing from said plurality of compensated sums at the peak and on either side of the peak and corresponding to the estimated carrier error.

24. The apparatus of claim 22, wherein the processor is further programmed to determine phase from one of said plurality of compensated sums at the peak and corresponding to the estimated carrier error.

* * * * *